(12) United States Patent
Obadia et al.

(10) Patent No.: US 11,970,133 B2
(45) Date of Patent: Apr. 30, 2024

(54) SAFETY BELT, IN PARTICULAR FOR AN AIRCRAFT SEAT

(71) Applicant: Safran Seats, Plaisir (FR)

(72) Inventors: Jean-Marc Obadia, L'Isle-d'Abeau (FR); Lisandre Marcovici-Soulage, Issoudun (FR); Léo Pouy, Laval (FR)

(73) Assignee: Safran Seats, Plaisir (FR)

( * ) Notice: Subject to any disclaimer, the term of this patent is extended or adjusted under 35 U.S.C. 154(b) by 23 days.

(21) Appl. No.: 17/778,441

(22) PCT Filed: Nov. 13, 2020

(86) PCT No.: PCT/EP2020/082120
§ 371 (c)(1),
(2) Date: May 20, 2022

(87) PCT Pub. No.: WO2021/104901
PCT Pub. Date: Jun. 3, 2021

(65) Prior Publication Data
US 2022/0396238 A1 Dec. 15, 2022

(30) Foreign Application Priority Data
Nov. 29, 2019 (FR) ....................... 1913520

(51) Int. Cl.
*B60R 22/48* (2006.01)
*B64D 11/06* (2006.01)

(52) U.S. Cl.
CPC ............ *B60R 22/48* (2013.01); *B64D 11/062* (2014.12); *B60R 2022/4816* (2013.01); *B60R 2022/4841* (2013.01); *B60R 2022/4866* (2013.01)

(58) Field of Classification Search
CPC .................................................. B60R 22/48
See application file for complete search history.

(56) References Cited

U.S. PATENT DOCUMENTS 3,351,381 A 11/1967 Boblitz
3,794,135 A * 2/1974 Ewert ..................... B60R 22/04
280/802

(Continued)

FOREIGN PATENT DOCUMENTS

DE 102006030193 A1 1/2008
DE 102018002819 A1 10/2019

OTHER PUBLICATIONS

International Patent Application No. PCT/EP2020/082120, International Search Report (with English translation) and Written Opinion, dated Feb. 12, 2021.

*Primary Examiner* — Joseph H Feild
*Assistant Examiner* — Pameshanand Mahase
(74) *Attorney, Agent, or Firm* — Kilpatrick Townsend & Stockton LLP

(57) ABSTRACT

The invention relates to a safety belt, which is in particular intended to be installed in an aircraft seat, comprising:
  a closing loop comprising a male element and a female element,
  a first strap which is connected to the male element and a second strap which is connected to the female element,
  the first strap and the second strap being capable of being attached together by means of the closing loop, which can change from an open state to a closed state through cooperation between the male element and the female element,
  the safety belt further comprising:
  a system for detecting that the safety belt is in the closed stated, the system being capable of generating an information item relating to a closed state of the safety belt, and
  a system for detecting that the safety belt is in a mechanically tensioned state, said system being capable of (Continued)

generating an information item relating to a mechanically tensioned state of at least one strap of the safety belt.

17 Claims, 5 Drawing Sheets

(56) References Cited

U.S. PATENT DOCUMENTS

| | | | |
|---|---|---|---|
| 4,659,108 A | 4/1987 | Sack et al. | |
| 6,454,304 B1 | 9/2002 | Steffens, Jr. | |
| 6,737,862 B1 | 5/2004 | Godoy et al. | |
| 2003/0150283 A1* | 8/2003 | Stanley | G01L 5/103 |
| | | | 73/862.391 |
| 2006/0219029 A1* | 10/2006 | Murphy | B60R 21/0155 |
| | | | 280/801.1 |
| 2013/0207442 A1* | 8/2013 | Sickon | G01B 7/003 |
| | | | 24/593.1 |

* cited by examiner

[Fig. 1]
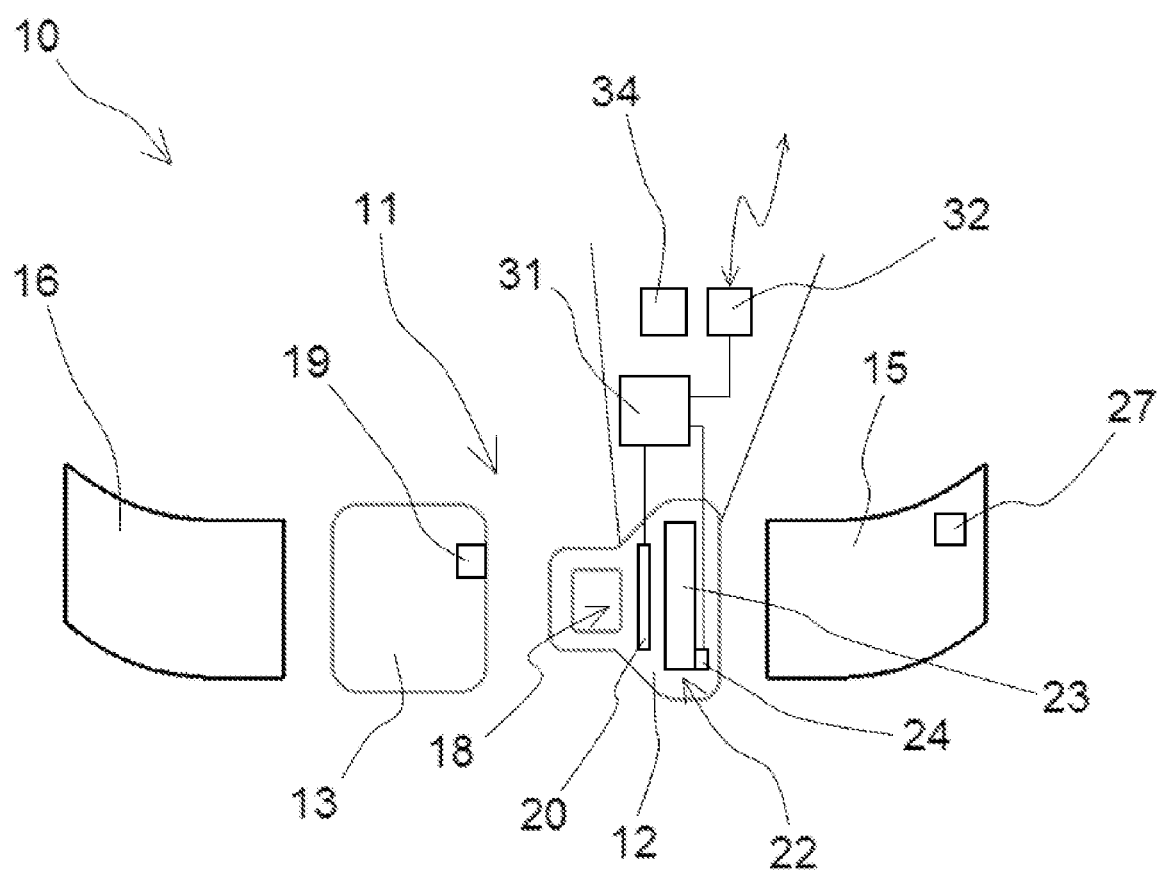

[Fig. 2]
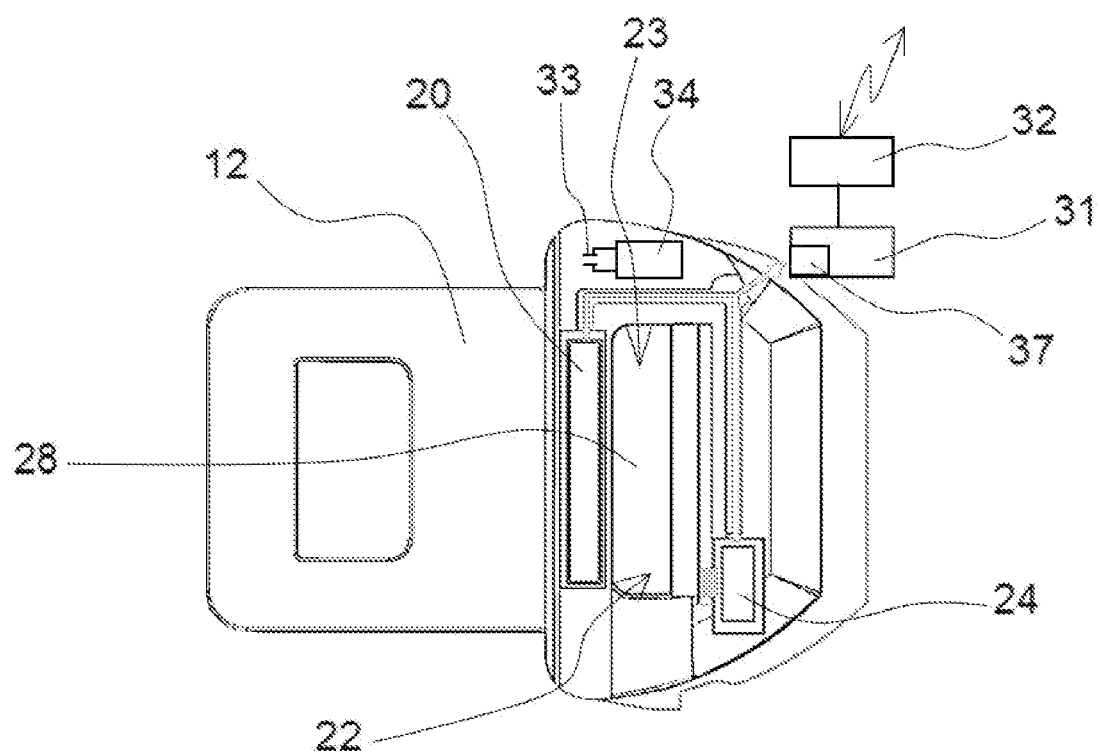
[Fig. 3]
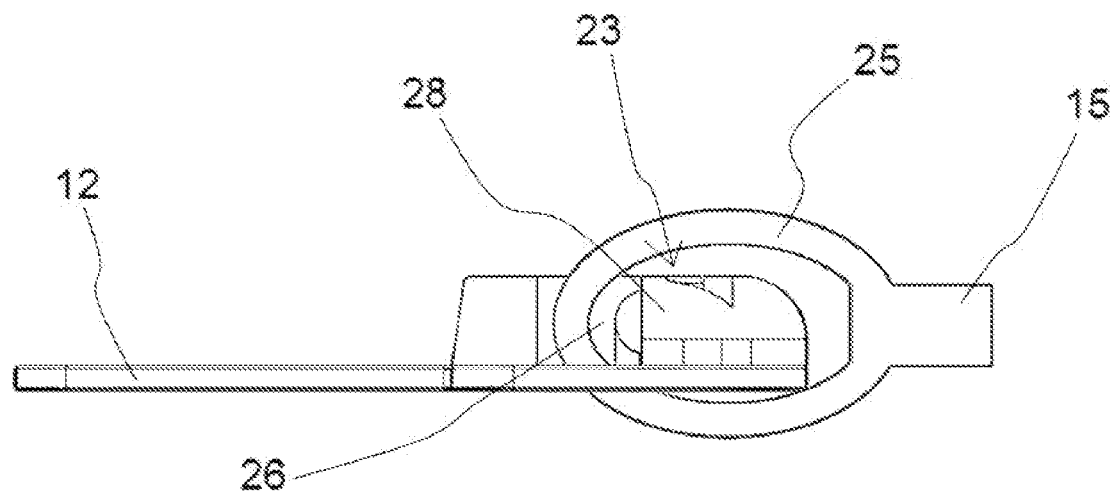

[Fig. 4]
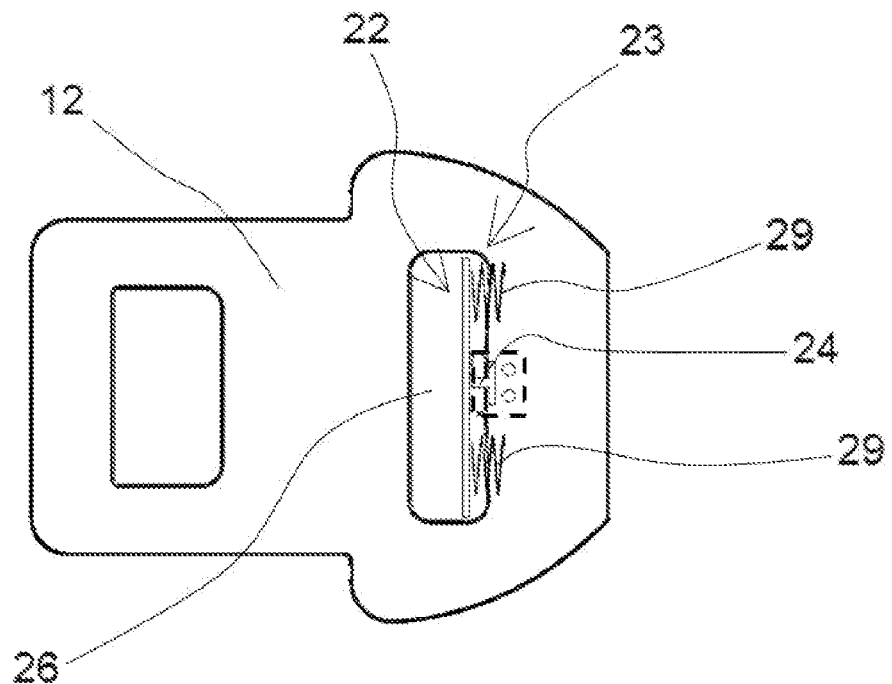
[Fig. 5]
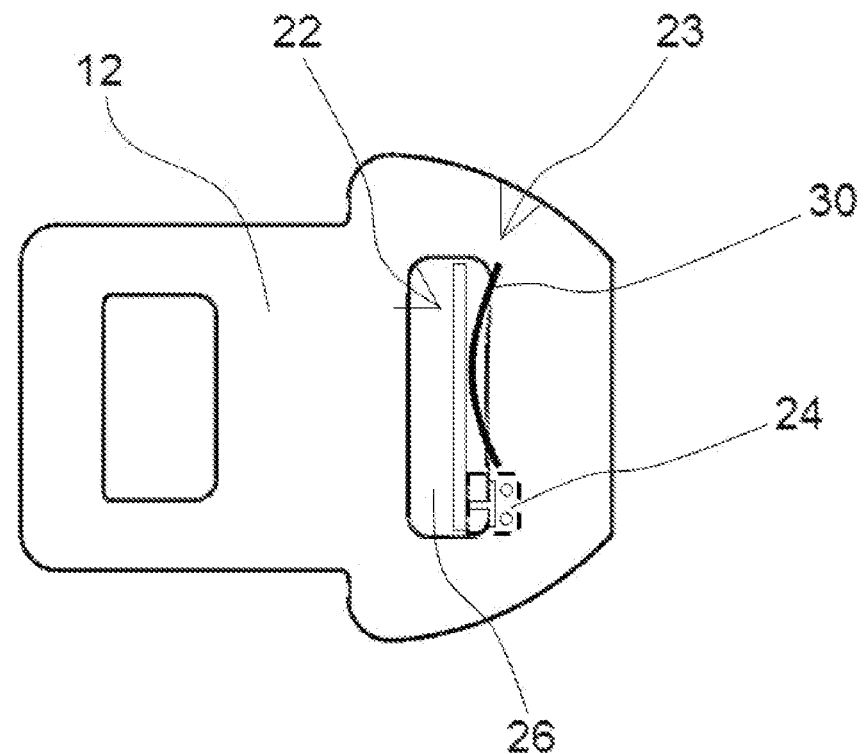

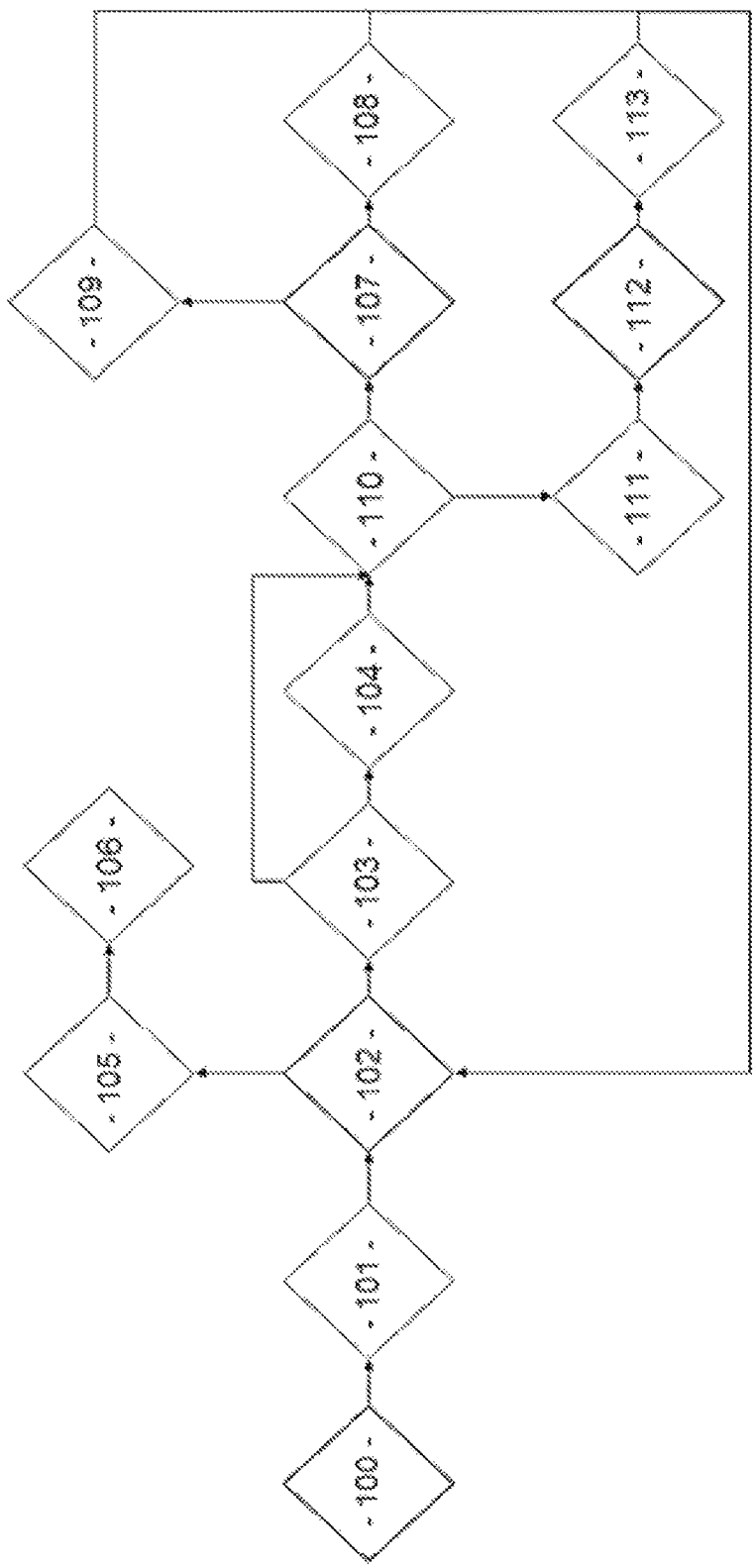
[Fig. 6]

[Fig. 7]
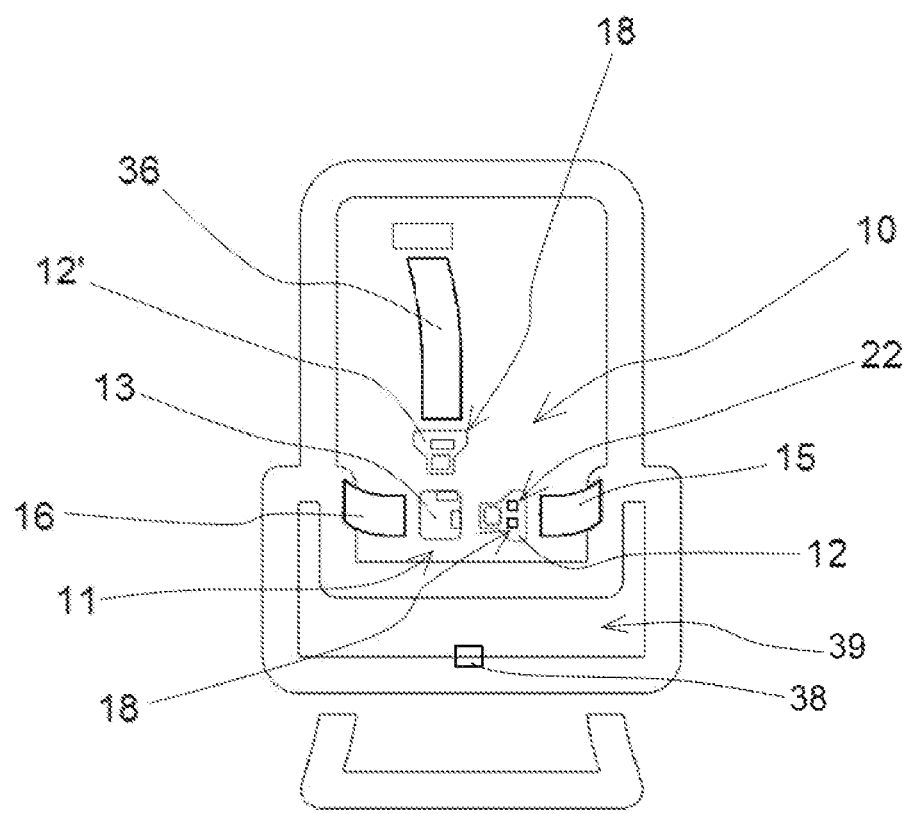

SAFETY BELT, IN PARTICULAR FOR AN AIRCRAFT SEAT

CROSS-REFERENCE TO RELATED APPLICATIONS

This application is a national phase application of International Patent Application PCT/EP2020/082120, filed on Nov. 13, 2020 and titled "Safety Belt, In Particular For An Aircraft Seat," which is related to and claims priority to French Patent Application No. 1913520, filed on Nov. 29, 2019, both of which are hereby incorporated by reference in their entireties.

The present invention relates to a safety belt, in particular a safety belt for an aircraft seat.

The invention is adaptable to all types of seats, in particular economic, business and first class seats of an aircraft and to all types of safety belts with 2, 3, 4 or 5-attachment points with or without self-winding system.

The present invention can also find an application in the field of transport vehicles (cars, buses, trains, etc.) requiring the use of a safety belt.

In the aircraft field, the known mechanisms for closing a safety belt are standard for almost all commercial flights. These standard mechanisms comprise in a manner known per se a closing buckle formed by a male element and a female element capable of cooperating with each other to ensure the closing of the belt. For belts with no self-winding, the male element and/or the female element can slide relative to a corresponding strap to adapt the belt to the passenger's morphology.

The closing of the safety belts is generally checked by on-board personnel, in particular during the parking, taxiing, taking-off and landing phases of the aircraft, but also in the event of turbulence and/or an emergency situation. However, such visual checks take a long time to perform, and do not make it possible to ensure that the passenger unfastens his/her safety belt immediately after the check carried out by the on-board personnel. Furthermore, there are possibilities of errors related to such visual checks carried out by a human being.

Some known devices, such as that described in document U.S. Pat. No. 6,737,862, detect the closing of the safety belt. However, these devices do not make it possible to detect the fit of the belt around the passenger's body.

The objective of the invention is to effectively remedy these drawbacks by proposing a safety belt, in particular to be installed on an aircraft seat, comprising:
 a closing buckle comprising a male element and a female element,
 a first strap connected to the male element and a second strap connected to the female element,
 the first strap and the second strap being adapted to be fastened together by means of the closing buckle which can pass from an open state to a closed state by causing the male element and the female element to cooperate with one another.
said safety belt further comprising:
 a system for detecting a safety belt closing state and generating a bit of information relating to a closing state of the safety belt, and
 a system for detecting the mechanical tension state of the safety belt and for generating a bit of information relating to a mechanical tension state of at least one strap of the safety belt.

The invention thus makes it possible to automatically check the safety belt in order to determine whether the belt is buckled and whether the strap is correctly stretched around the passenger. The invention also makes it possible to ensure that the safety belt is correctly positioned on the passenger and is not closed behind or under the passenger on his/her seat.

According to one embodiment, the system for detecting the closing state comprises:
 a magnetic element arranged on one of the elements among the female element and the male element of the closing buckle, and
 a magnetic field sensor placed on the other of the elements among the female element and the male element of the closing buckle.

According to one embodiment, the magnetic field sensor, in particular a Hall effect one, is a magnetic switch able to close due to the proximity of the magnetic element when the closing buckle is closed.

According to one embodiment, the sensor is of the capacitive type or an electromagnetic contactor requiring no magnet or an electromagnetic contactor requiring a magnet, such as a reed switch.

According to one embodiment, the system for detecting the mechanical tension state comprises an elastic member and a switch arranged between a portion of a strap buckle and a portion of a male element or a female element, in such a way that, when a mechanical tension applied to a strap exceeds a threshold, the strap deforms the elastic member and engages the switch to indicate that the safety belt is sufficiently tight around a portion of a passenger's body. As a variant or in addition, the system for detecting the mechanical tension state comprises a piezoelectric sensor or a strain gauge reacting to a pressure applied by a strap of the safety belt. The piezoelectric sensor or the gauge will be able to detect the deformation of the elastic member.

According to one embodiment, the elastic member consists of a folding rod.

According to one embodiment, the elastic member consists of at least one spring.

According to one embodiment, the elastic member is a leaf spring.

According to one embodiment, said safety belt comprises a control unit connected to the system for detecting the closing state of the safety belt and to the system for detecting a mechanical tension level of the safety belt.

According to one embodiment, said control unit is able to control a communication module, in particular a wireless one, in order to transmit the bit of information relating to the closing state of the safety belt and/or the bit of information relating to the mechanical tension state of the safety belt.

According to one embodiment, the control unit is configured to power up the communication module after detection of a change in state of the safety belt and to interrupt a power supply to the communication module after said module communication transmitted the change in state of the safety belt.

According to one embodiment, the control unit is configured to detect a change in mechanical tension state only if the switch changes in state for a duration greater than a threshold and if the closing buckle is in a closed state.

According to one embodiment, the control unit is configured to pass into a standby mode after a predetermined period of inactivity.

According to one embodiment, said safety belt comprises a source of electrical energy, in particular a battery, in order to be electrically autonomous.

According to one embodiment, a capacitor is electrically connected in parallel with the source of electrical energy so as to cause a current consumption of the source of electrical energy in order to avoid its passivation linked to a long period of inactivity of the source of electrical energy.

According to one embodiment, the control unit incorporates a counter for counting a number of activations of the communication module in order to evaluate a remaining level of electrical energy of the source of electrical energy.

According to one embodiment, the safety belt comprises a stop placed on a part of an adjustable strap so as to prevent the safety belt from being tightened when nobody is seated in the corresponding seat.

According to one embodiment, a fixed strap has a sufficient length preventing the safety belt from being tightened when nobody is seated in the corresponding seat.

According to one embodiment, the magnetic sensor of the system for detecting the safety belt closing state and the system for detecting the mechanical tension state of the safety belt are arranged on the same male or female element of the safety belt.

The invention also relates to a seat comprising a safety belt as previously defined.

The invention further relates to an aircraft comprising a seat as previously defined.

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein:

FIG. 1 is a schematic representation of a safety belt according to the present invention;

FIG. 2 is a schematic front representation of a male element of a closing buckle incorporating a system for detecting the mechanical tension state of the safety belt;

FIG. 3 is a schematic side representation of the male element in FIG. 2;

FIGS. 4 and 5 are schematic representations of alternative embodiments of the system for detecting the mechanical tension state of the safety belt;

FIG. 6 is a diagram of operation steps for a safety belt according to the present invention;

FIG. 7 is a schematic representation of a belt of three-points type integrated on a seat, in particular an aircraft seat.

It should be noted that, in the figures, the structural and/or functional elements common to the different embodiments may have the same references. Thus, unless otherwise stated, such elements have identical structural, dimensional and material properties.

FIG. 1 shows a safety belt 10, in particular to be installed on an aircraft seat, comprising a closing buckle 11 comprising a male element 12 and a female element 13, as well as a first strap 15 connected to the male element 12 and a second strap 16 connected to the female element 13.

The first strap 15 and the second strap 16 are made of fabric. The first strap 15 and the second strap 16 are adapted to be fastened together by means of the closing buckle 11 which can pass from an 'open' state to a 'closed' state by causing the male element 12 and the female element 13 to cooperate with one another. The male element 12 and/or the female element 13 can slide relative to a corresponding strap 15, 16 to adapt the belt to the passenger's morphology.

A system 18 for detecting the closing state of the safety belt 10 is capable of generating a bit of information relating to the closing state of the safety belt 10.

For this purpose, the system 18 for detecting the closed state comprises a magnetic element 19, such as a magnet, arranged on the female element 13 and a magnetic field sensor 20 placed on the male element 12. As a variant, the structure could be reversed, that is to say that the magnetic element 19 could be placed on the female element 13 and the magnetic field sensor 20 could be placed on the male element 12. As a variant, the magnetic element 20 may be a coil through which a current flows.

The magnetic field sensor 20 is preferably a magnetic switch, in particular a reed switch capable of closing due to the proximity of the magnetic element 19 when the buckle 11 is in the closed state. As a variant, the magnetic field sensor 20 is a Hall effect sensor. As a variant, the sensor is of the capacitive type or an electromagnetic contactor requiring no magnet. As a variant, it would be possible to use other means for detecting the closing of the belt buckle, such as a piezoelectric sensor or a strain gauge.

Furthermore, a system 22 for detecting the mechanical tension state of the safety belt 10 is capable of generating a bit of information relating to a mechanical tension state of at least one strap 15, 16 of the safety belt 10. Thus, a bit of information relating to a 'tight' state of the belt 10 is generated by the system 22 when the tension applied to a strap 15, 16 exceeds a threshold and the belt buckle 11 is in a closed state or a bit of information relating to a 'relaxed' state when the mechanical tension applied to a strap 15, 16 is below the threshold.

To this end, as shown in FIG. 2, the system 22 for detecting the mechanical tension state comprises an elastic member 23 and a switch 24 arranged between a portion of a strap buckle 25 clearly visible in FIG. 3 and a portion of the male element 12. The strap buckle 25 passes inside an opening 26 in the male element 12 in order to secure the strap 16 with the male element 12. As a variant, the elastic member 23 and the switch 24 are arranged on the female element 13. The integration of the system 22 on the male element 12 or the female element 13 of the belt avoids to install it on a strap 15, 16 which generates an uncomfortable bead for the passenger.

Thus, when a mechanical tension applied to the strap 16 exceeds a threshold, the strap buckle 25 deforms the elastic member 23 and engages the switch 24, which indicates that the belt is sufficiently tight. The elastic member 23 is calibrated so as to allow the engagement of the switch 24 when the mechanical tension applied to the strap 16 exceeds a mechanical tension threshold between 5 and 20 Newtons, for example of the order of 10 Newtons. By "of the order of" it is meant a variation of plus or minus 10% around the target value. The switch 24 is deactivated when the mechanical tension applied to the strap 16 passes under the threshold. By 'engagement' of the switch 24 it is meant a passage of the switch 24 from a default open state to a closed state or, conversely, a passage from the default closed state to an open state of the switch 24.

As a variant or in addition, the system 22 for detecting the mechanical tension state comprises a piezoelectric sensor or a strain gauge reacting to a pressure applied by a strap of the safety belt. The piezoelectric sensor or the gauge will be able to detect the deformation of the elastic member 23.

As can be seen in FIG. 1, the safety belt 10 may include a stop 27 placed on a portion of a strap 15, 16 that is adjustable so as to prevent the safety belt 10 from being tightened when nobody is in the corresponding seat. Thus, the stop 27 prevents the switch 24 from being engaged if the straps 15, 16 are not placed around the passenger's body, in particular in the case where the belt is placed behind or under the passenger. The stop 27 may take the form of an added element sewn onto a strap 15, 16.

Alternatively, a fixed strap 15, 16 has a sufficient length preventing the safety belt 10 from being tightened when nobody is in the corresponding seat. For this purpose, a minimum length of a strap 15, 16 is greater than the distance between the closing buckle 11 and the anchoring points on either side of the seat.

In the embodiment in FIGS. 2 and 3, the elastic member 23 consists of a folding rod 28. The strap buckle 25 therefore bends the rod 28 when the belt 10 is tensioned.

In the embodiment in FIG. 4, the elastic member 23 consists of at least one spring 29, for example of the helical type.

In the embodiment in FIG. 5, the elastic member 23 consists of at least one leaf spring 30.

A control unit 31 is connected to the system 18 for detecting the closing state of the safety belt 10 and to the system 22 for detecting the mechanical tension state of the safety belt 10.

The control unit 31 is capable of controlling a communication module 32, in particular a wireless one, to transmit the bit of information relating to the closing state of the safety belt 10 and/or the bit of information relating to the mechanical tension state of the safety belt 10. The control unit 31 is capable of detecting four states of the belt, namely the 'open', 'closed', 'tensioned' and 'relaxed' states.

The control unit 31 is configured to power up the communication module 32 after detection of a change in state of the safety belt 10 and to interrupt a power supply of the communication module 32 after said module communication 32 transmitted the change in state of the safety belt 10.

The control unit 31 is configured to detect a change in mechanical tension state (passage from the 'relaxed' state to the 'tensioned' state or conversely passage from the 'tensioned' state to the 'relaxed' state) only if the switch 24 changes in state for a duration greater than a threshold, for example of the order of 10 seconds, and if the closing buckle 11 is in the closed state.

Preferably, the belt 10 comprises a source of electrical energy 34, in particular a battery, to be electrically autonomous. The battery 34 is for example a lithium battery. As illustrated in FIG. 2, a capacitor 33 is electrically connected in parallel with the battery 34 so as to cause a current consumption of the battery 34 in order to avoid its passivation linked to a long period of inactivity of the battery 34.

Preferably, the control unit 31 incorporates a counter 37 for counting a number of activations of the communication module 32 so as to evaluate a remaining level of electrical energy in the battery 34. Indeed, the communication module 32 is the most energy-consuming organ in the system. Consequently, by knowing the electrical energy available in the battery 34 and by counting the number of activations of the communication module 32, it is possible to deduce therefrom the remaining level of electrical energy in the battery 34.

Preferably, the magnetic sensor 20 of the system 18 for detecting the closing state of the safety belt 10, and the system 22 for detecting the mechanical tension state of the safety belt 10 are arranged on the same male 12 or female 13 element of the safety belt 10. This facilitates the electrical connections with the control unit 31.

It is described below with reference to FIG. 6 the operating steps of the safety belt 10 according to the invention.

When fastening the belt, which occurs in a step 100, the magnetic switch 20 of the buckle closes, which switches a static relay which makes it possible to supply the control unit 31 with energy via the battery. (cf. step 101). The control unit 31 also drives the relay so as to be able to control its own power supply. The static relay is for example based on a MOSFET transistor.

In the case where the belt is well buckled (cf. step 102) and its state is different from a previous state (cf. step 103), the control unit 31 powers up the communication module 32 via an analog static relay. The control unit 31 then transmits the 'buckled' state to the communication module 32. The wireless communication module 32 transmits, in a step 104, the buckled state to a communication module 32 which sends it to a centralized system. Once the transmission has been carried out, the control unit 31 interrupts the power supply to the communication module 32 in order to save energy. Otherwise, the communication module 32 transmits an 'unbuckled' state in a step 105 and the system is deactivated in a step 106.

If the belt is fastened, the control unit 31 calculates in a step 107 a closing duration for the switch 24 of the mechanical tension. If this duration is greater than a predetermined duration, for example of the order of 10 seconds, the control unit 31 then detects a 'tight' state of the safety belt 10. The control unit 31 powers up the communication module 32 and transmits the 'tensioned' state to said communication module 32 in a step 108. The wireless communication module 32 then transmits this state to the centralized system. Once the transmission has been carried out, the control unit 31 interrupts the power supply to the communication module 32.

The control unit 31 then calculates the opening duration for the switch 24 of the mechanical tension. If this duration is greater than a predefined duration, for example of the order of 10 seconds, the control unit 31 then detects the 'relaxed' state of the belt in a step 109. The control unit 31 powers up the communication module 32 and transmits the relaxed state to the communication module 32. The wireless communication module 32 in turn transmits it to the centralized system. Once the transmission has been carried out, the control unit 31 interrupts the power supply to the communication module 32.

Throughout the supply period for the control unit 31, at each step transition and during the steps of calculating the closing or opening duration for the switch 24 of the mechanical tension, the control unit 31 verifies whether the magnetic buckling switch 20 is still closed. If this is no longer the case, that is to say if the closing buckle 11 is open, the control unit 31 powers up the communication module 32 and transmits the 'unbuckled' state to it. The wireless communication module 32 in turn transmits this state to the centralized system. Once the transmission has been carried out, the control unit 31 interrupts the power supply to the communication module 32. The control unit 31 then interrupts its own power supply and will work again during a new buckling process.

It should be noted that the activity of the belt is preferably supervised in a step 110. The control unit 31 is configured to switch to a standby mode in a step 111 after a predetermined period of inactivity, by example of the order of 2 seconds. This minimizes the power consumption of the system. The system becomes active again in a step 112 as soon as a change in state occurs due to the unbuckling, tightening, or loosening of the belt in a step 113.

The preceding description has been made for a safety belt 10 with two fixing points comprising two straps 15, 16 enclosing a portion of a passenger's body at his/her pelvis.

In the embodiment in FIG. 7, a seat provided with a belt with three fixing points comprises, in addition to the first strap 15 and the second strap 16, a third strap 36 associated with a second male element 12' to keep the passenger at one of his/her shoulder. In this case, the first male element 12 comprises a system 18 for detecting the closing state of the safety belt, and a system 22 for detecting the mechanical tension state of the safety belt. The second male element 12 may comprise only a system 18 for detecting the closing state of the safety belt.

We can also provide a sensor 38 for detecting the presence of the passenger on the seat or on the belt buckle. This sensor 38 is arranged inside a seating surface 39 of the seat or on the belt buckle so as to determine whether a passenger is present in the seat. When present in the seat buckle, this sensor 38 could for example take the form of an accelerometer, a capacitive sensor, or any other sensor suitable for the application. When present on the seat, this sensor 38 could for example take the form of an accelerometer, a capacitive sensor, a piezoelectric sensor, a strain gauge, or any other sensor suitable for the application. It will thus be possible, in particular during the taking-off and landing phases of the aircraft, to send a signal to a member of the crew or the passenger in the event that the presence of a passenger in his/her seat would be detected but the safety belt 10 would not be correctly tensioned. This could mean that the passenger has inadvertently sat down on the belt 10 and it is therefore necessary to alert him/her so as to avoid any risk for his/her safety.

The invention also relates to an aircraft comprising a seat with two or three fixing points as previously defined.

Of course, the different characteristics, variants and/or embodiments of the present invention can be associated with each other in various combinations insofar as they are not incompatible or mutually exclusive Obviously, the invention is not limited to the above-described embodiments, provided only as an example. It encompasses various modifications, alternative forms and other variants that can be considered by the skilled person within the framework of the present invention, including any combination of the various above-described modes of operation, which may be taken separately or in combination.

The invention claimed is:

1. A safety belt, in particular to be installed on an aircraft seat, comprising:
    a closing buckle comprising a male element and a female element,
    a first strap connected to the male element and a second strap connected to the female element,
    the first strap and the second strap being adapted to be fastened together by means of the closing buckle which can pass from an open state to a closed state by causing the male element and the female element to cooperate with one another, wherein said safety belt further comprises:
    a system for detecting the closing state of the safety belt and generating a bit of information relating to a closing state of the safety belt, and
    a system for detecting a mechanical tension state of the safety belt and generating a bit of information relating to the mechanical tension state of at least one strap of the safety belt,
    the system for detecting the closing state comprising:
    a magnetic element arranged on one of the elements among the female element and the male element of the closing buckle, and
    a magnetic field sensor placed on the other of the elements among the female element and the male element of the closing buckle,
    the magnetic sensor of the system for detecting the closing state of the safety belt and the system for detecting the mechanical tension state of the safety belt being arranged on the same male or female element of the safety belt,
    the system for detecting the mechanical tension state comprising an elastic member and a switch arranged between a portion of a strap buckle and a portion of a male element or a female element in such a way that, when a mechanical tension applied to a strap exceeds a threshold, the strap deforms the elastic member and activates the switch to indicate that the safety belt is sufficiently tight around a portion of a passenger's body.

2. The safety belt according to claim 1, wherein the magnetic field sensor is a magnetic switch able to close due to proximity of the magnetic element when the closing buckle is closed.

3. The safety belt according to claim 1, wherein the elastic member consists of a folding rod.

4. The safety belt according to claim 1, wherein the elastic member consists of at least one spring.

5. The safety belt according to claim 1, wherein the elastic member is a leaf spring.

6. The safety belt according to claim 1, further comprising a control unit connected to the system for detecting the closing state of the safety belt and the system for detecting a mechanical tension level of the safety belt.

7. The safety belt according to claim 6, wherein said control unit is able to control a communication module, in particular a wireless one, in order to transmit the bit of information relating to the closing state of the safety belt and/or the bit of information relating to the mechanical tension state of the safety belt.

8. The safety belt according to claim 7, wherein the control unit is configured to power up the communication module after detection of a change in state of the safety belt and to interrupt a power supply to the communication module after said communication module transmitted the change in state of the safety belt.

9. The safety belt according to claim 6, wherein the control unit is configured to detect a change in the mechanical tension state only if the switch changes in state for a duration greater than a threshold and if the closing buckle is in the closed state.

10. The safety belt according to claim 6, wherein the control unit is configured to switch to a standby mode after a predetermined duration of inactivity.

11. The safety belt according to claim 1, further comprising a source of electrical energy, in particular a battery, in order to be electrically autonomous.

12. The safety belt according to claim 11, wherein a capacitor is electrically connected in parallel with the source of electrical energy so as to cause a current consumption of the source of electrical energy in order to avoid its passivation linked to a long period of inactivity of the source of electrical energy.

13. The safety belt according to claim 12, wherein a control unit integrates a counter for counting a number of activations of the communication module in order to evaluate a remaining level of electrical energy of the source of electrical energy.

14. The safety belt according to claim 1, wherein it comprises a stop placed on a part of an adjustable strap so as to prevent the safety belt from being tightened when nobody is seated in the corresponding seat.

15. The safety belt according to claim 1, wherein a fixed strap has a sufficient length preventing the safety belt from being tightened when nobody is seated in the corresponding seat.

16. A seat comprising a safety belt as defined in claim 1.

17. An aircraft comprising a seat as defined in claim 1.

* * * * *